United States Patent
Puma et al.

(10) Patent No.: US 7,545,885 B2
(45) Date of Patent: Jun. 9, 2009

(54) COMPENSATION FOR THE CARRIER FREQUENCY OFFSET IN A RECEIVING APPARATUS, WHICH IS DESIGNED FOR A PLURALITY OF MODULATION TYPES, IN A MOBILE COMMUNICATIONS SYSTEM

(75) Inventors: Giuseppe Li Puma, Bochum (DE); Markus Hammes, Dinslaken (DE)

(73) Assignee: Infineon Technologies AG, Munich (DE)

( * ) Notice: Subject to any disclaimer, the term of this patent is extended or adjusted under 35 U.S.C. 154(b) by 605 days.

(21) Appl. No.: 11/263,423

(22) Filed: Oct. 31, 2005

(65) Prior Publication Data

US 2006/0115021 A1 Jun. 1, 2006

(30) Foreign Application Priority Data

Nov. 2, 2004 (DE) .................... 10 2004 052 898

(51) Int. Cl.
H04L 27/00 (2006.01)
(52) U.S. Cl. ..................................... 375/316
(58) Field of Classification Search ............. 375/269, 375/272, 303, 316, 329, 330, 331, 332, 333, 375/334, 335, 336, 337; 329/300; 332/100
See application file for complete search history.

(56) References Cited

U.S. PATENT DOCUMENTS 7,228,113 B1 * 6/2007 Tang et al. ................. 455/101
7,233,630 B2 * 6/2007 Murakami et al. ........... 375/316
7,415,078 B2 * 8/2008 Smit ......................... 375/330
2001/0022805 A1 9/2001 Dabak et al.

FOREIGN PATENT DOCUMENTS

DE 199 48 899 A1 4/2001
EP 1 484 880 A2 12/2004

OTHER PUBLICATIONS

"The CORDIC Trigonometric Computing Technique", Jack E. Volder, IRE Transactions On Electronic Computers, vol. 8, Sep. 1959, pp. 330-334.

* cited by examiner

Primary Examiner—Sam K Ahn
(74) Attorney, Agent, or Firm—Eschweiler & Associates, LLC

(57) ABSTRACT

The present invention relates to a receiving apparatus for a mobile communications system which can be modulated using different modulation types at the transmitter end. According to one embodiment of the invention, in the middle of a data burst of a Bluetooth communications system, a GFSK modulation method is switched to an M-DPSK modulation method, which is used for the payload data. A frequency offset estimation unit is provided for GFSK-modulated signals in a first receiving section and estimates the frequency offset by averaging over a bit sequence of a trailer of a data burst. The frequency offset is corrected in a second receiving section, by means of a frequency correction unit which operates on the basis of the CORDIC algorithm.

20 Claims, 8 Drawing Sheets

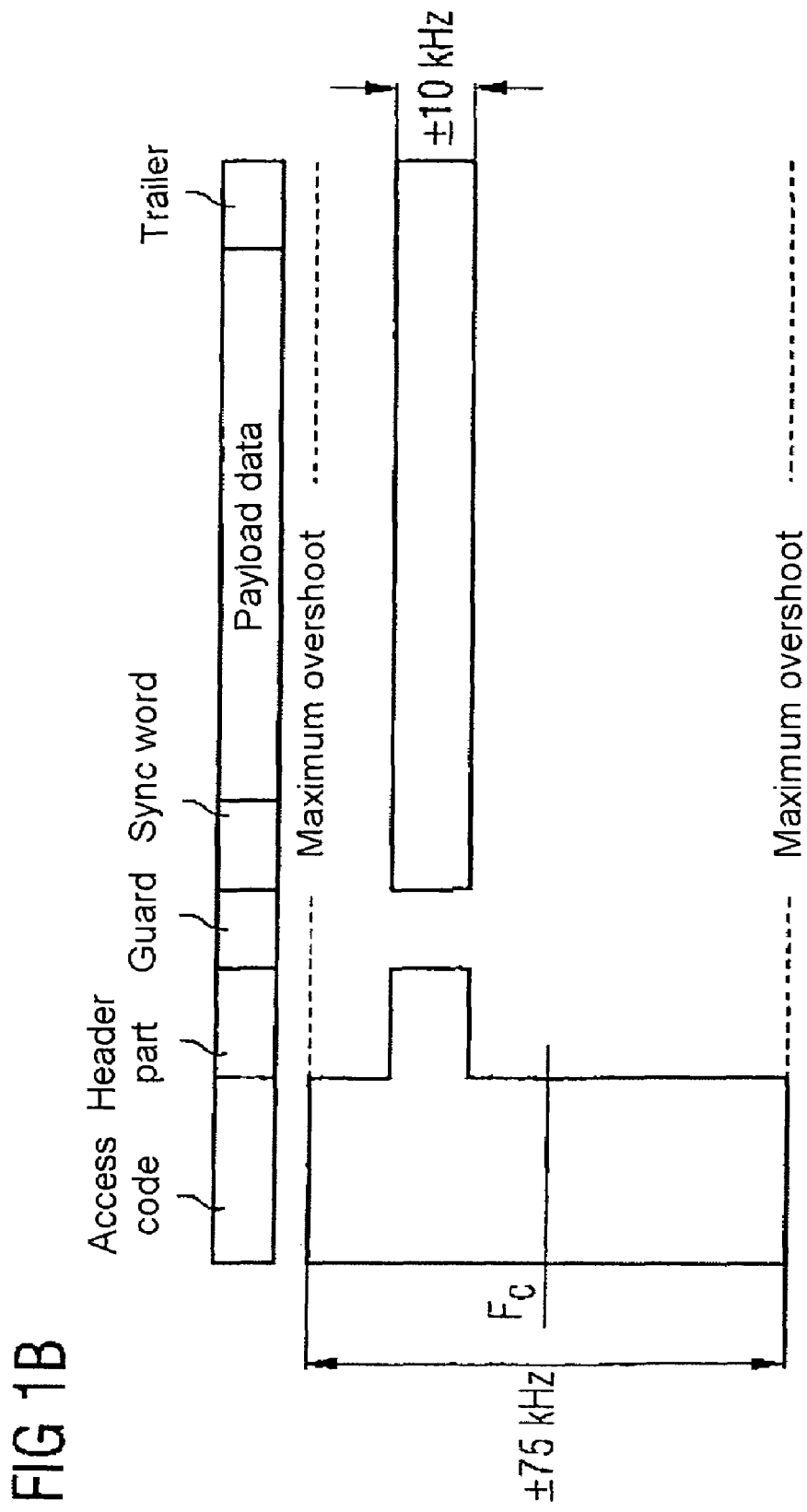

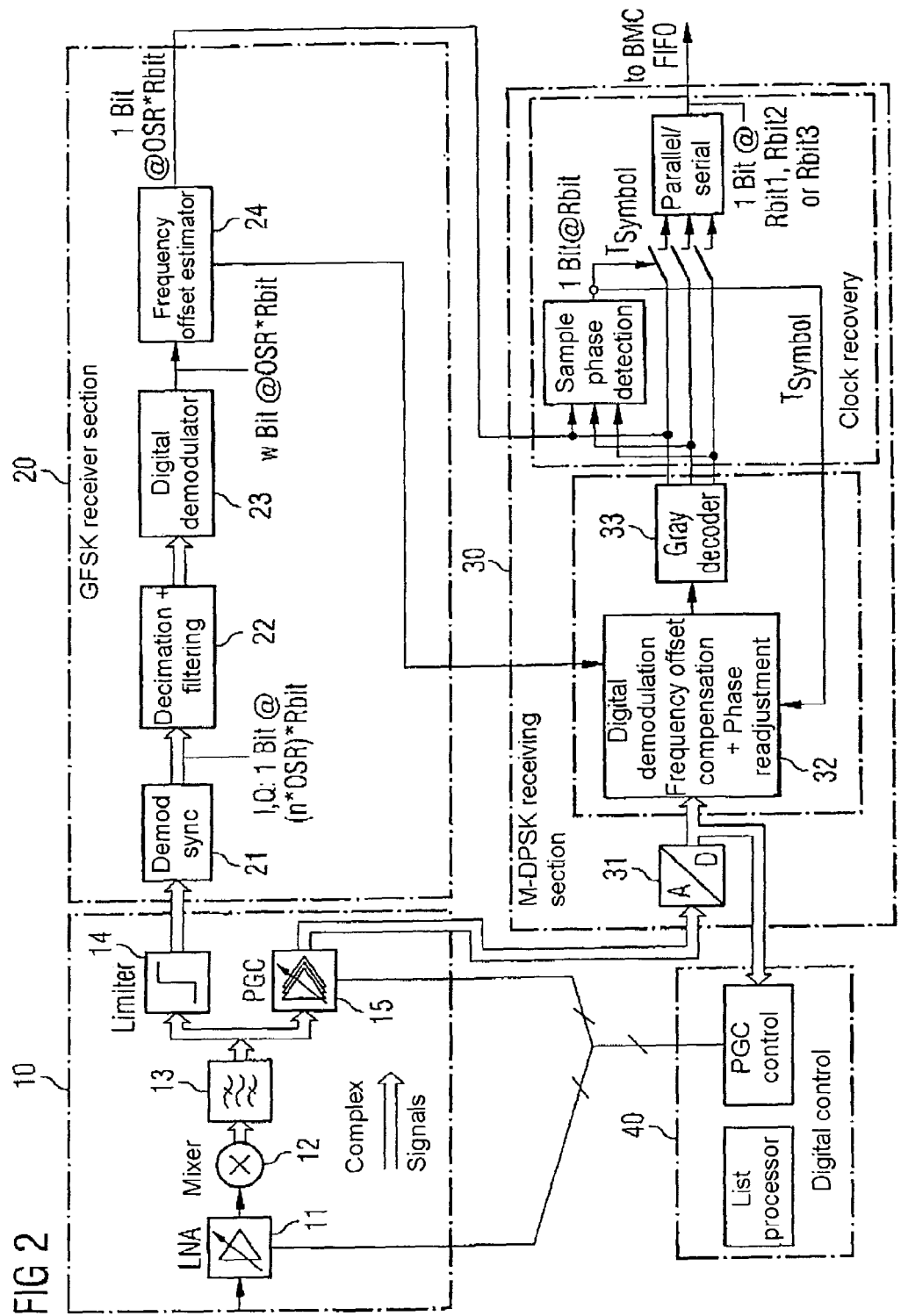

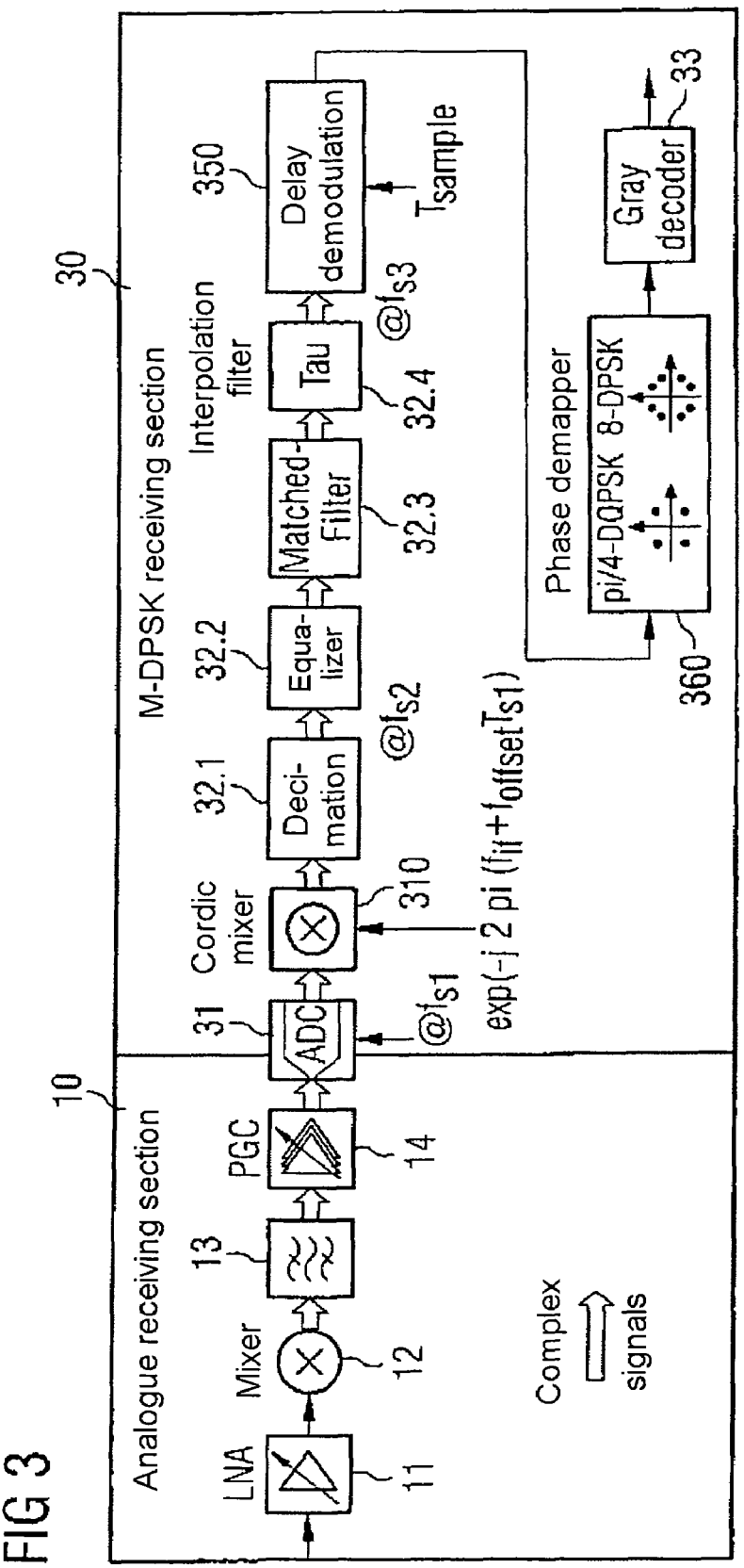

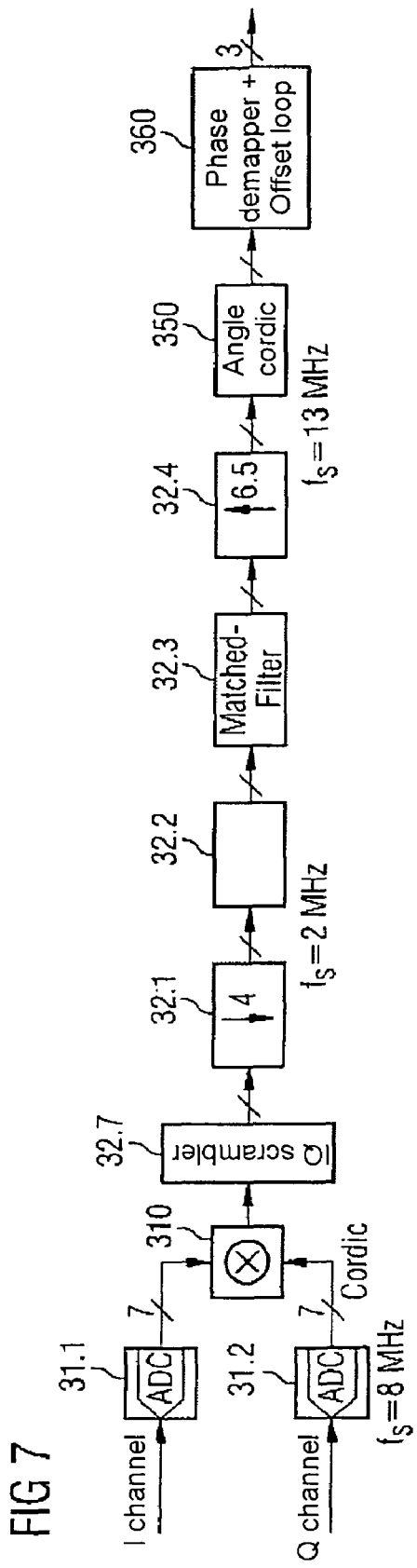

COMPENSATION FOR THE CARRIER FREQUENCY OFFSET IN A RECEIVING APPARATUS, WHICH IS DESIGNED FOR A PLURALITY OF MODULATION TYPES, IN A MOBILE COMMUNICATIONS SYSTEM

REFERENCE TO RELATED APPLICATIONS

This application claims the benefit of the priority date of German application DE 10 2004 052 898.5, filed on Nov. 2, 2004, the contents of which are herein incorporated by reference in their entirety.

FIELD OF INVENTION

The present invention relates to a receiving apparatus for a mobile communications system, the receiving apparatus designed to demodulate received signals, which can be modulated using different modulation types at the transmitter end.

BACKGROUND OF THE INVENTION

In digital cordless communications systems which are based on the Bluetooth Standard Version 1.1, the data is transmitted at a rate of about 1 Mbit/s. A two-value GFSK (Gaussian Frequency Shift Keying) modulation method is used in this case. The GFSK modulation method is a frequency-keying modulation method (FSK—Frequency Shift Keying). Furthermore, a Gaussian filter is used at the transmission end in order to limit the frequency bandwidth for GFSK-based modulation. A filter such as this carries out pulse shaping of the frequency or data pulses, with the pulse for each data symbol extending over a time of more than one symbol time period T.

In order to achieve higher data transmission rates, one option is to use modulation methods with more values, such as the four-value DQPSK method (Differential Quadrature Phase Shift Keying) or, in general, the DMPSK method, in which an M-value symbol where $M \geq 4$ is transmitted instead of a two-value bit. Future versions of the Bluetooth Standard (possibly even from Version 1.2, but at the latest from Version 2.0) are planning on the data rate being increased by using modulation methods with more values.

In order to increase the data rate in later versions of a standard in standardized digital radio transmission systems, it is worthwhile changing from a modulation method with a small number of values (for example GFSK) to a modulation method with more values (for example DQPSK) once the radio link has been in existence for a certain time. This allows backward compatibility of the new versions of the Standard to the earlier versions of the Standard. The process of setting up a connection, or of setting up a so-called pico network in the case of the Bluetooth Standard, can in this case be carried out by means of the modulation method with a small number of values, which is used for all the appliances to that Standard. If both the appliances in a link that has been set up or in the pico network are designed for modulation with more values, they can be used for the subsequent data transmission.

In general, in digital TDMA (Time Division Multiple Access)-based mobile radio systems, the information is transmitted in the form of data bursts whose timings are defined. In the case of packet-oriented mobile radio systems, a data packet to be transmitted extends over one or more data bursts. A data burst comprises a first data burst header or data packet header. The header contains information required for addressing the remote location and for indication of the packet type, and should thus, for compatibility reasons, be transmitted using a modulation method with a small number of values for all versions of the Standard. In particular, it is also feasible for the header to be indicated to the respective remote location by switching to a second modulation method, which uses more values. Switching to a modulation method which uses more values is then carried out only in a second part of the data burst. If a plurality of data packets are transmitted in succession, the modulation method is thus switched alternately a number of times.

One fundamental problem with wireless communications systems is the frequency offset between the transmitter and the receiver, that is to say an error between the carrier frequency of the received signal and the frequency applied to the mixer in the receiver in order to down-mix the received signal. This may mean either the frequency which is supplied to a single mixer for direct down-mixing to baseband or else the frequency which is supplied to a first mixer for down-mixing to an intermediate frequency and the frequency which is supplied to a second mixer for down-mixing from the intermediate frequency to baseband.

In order to overcome this problem, the frequency offset must be estimated and corrected at the receiver end. In particular, wireless communications systems such as Bluetooth or DECT require a simple solution in terms of the implementation complexity and the power consumption, since the manufacturers are subject to stringent requirements for low costs and low power consumption at the same time. Receiving appliances for cordless communications systems preferably use low-cost crystal oscillators with a relative accuracy of typically 20 ppm. For a Bluetooth communications system, this means a frequency offset in one of two communication partners of 50 kHz. Since the frequency offset can also occur with an opposite mathematical sign in the two communication partners, that is to say the transmitter and the receiver, the maximum frequency offset may be about 100 kHz. Thus, in order to ensure good reception quality, it is absolutely essential to estimate and compensate for the frequency offset in the receiver.

FIG. 1a illustrates the structure of a data burst which can be transmitted by radio in a Bluetooth transmission system based on a Bluetooth Standard higher than 1.1 between the subscribers in a pico network, which has been previously set-up. In FIG. 1a, the data burst or the data packet has an access code which is arranged at the start, has a time duration of 72 μs and comprises a 4 μs-long preamble, a 64 μs-long synchronization word and a 4 μs-long trailer. The access code is modulated using the two-value GFSK modulation method. Identification and synchronization information for the pico network is sent on a standard-specific basis by means of the access code.

In this example, the data is sent at a first data rate of 1 Mbit/s. The access code is followed by a header with a time duration of 52 μs, which is likewise modulated using the two-value GFSK modulation method. In addition to addressing information and details relating to the packet type being used, the header can also contain information about a second data rate which is intended for transmitting subsequent payload data. The header is followed by a section which is formed from an optional, 5 μs-long guard time interval and an 11 μs-long synchronization or training sequence. No data is transmitted during the optional time period for the guard time interval. The guard time interval is used for switching of the modulation-dependent components at the transmission and reception ends.

The synchronization or training sequence has a sequence of training symbols which are known to the receiver and are used for channel estimation. This training sequence is followed by the payload data area. This is transmitted using a second modulation method, based on DMPSK modulation, where $M \geq 4$. The payload data end is then followed by a trailer that also ends the data burst.

FIG. 1b illustrates in schematic form the tolerance requirements for the frequency offset over the data burst. According to the figure, the maximum error from a nominal carrier frequency $F_C$ during the access code is ±75 kHz. This value relates to the initial frequency offset, including any drift that may occur during the time period of the access code. Any drift that occurs after an initial frequency offset and throughout the rest of the data burst should not exceed ±10 kHz.

The receiver architectures which are known in the prior art, use a frequency offset compensation circuit which is used to set the reference frequency which is emitted from the crystal oscillator, based on an estimated value of the frequency offset. However, this is disadvantageous as additional hardware is required and a relatively long time is required for adjustment of the crystal oscillator.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

Accordingly, one objective of the present invention is to specify a receiving apparatus for a mobile communications system designed to demodulate received signals which have been modulated using different modulation types, and in which a frequency offset can be estimated and compensated utilizing relatively low complexity while achieving a fast response time.

In accordance with one embodiment of the present invention a receiving apparatus for a mobile communications system comprises a first receiving section designed to demodulate received signals of a first modulation type, and a second receiving section designed to demodulate received signals of a second modulation type. The first receiving section contains a frequency offset estimation unit, and the second receiving section contains a frequency correction unit to correct the frequency offset. The first receiving section is connected to the second receiving section for the transmission of the estimated frequency offset.

The invention thus provides the capability for efficient compensation of the frequency offset between the transmitter and the receiver. The frequency offset can be estimated quickly and efficiently based on received signals using the first modulation type, and can then be transferred to the second receiving section, in which the received signals are processed based on the second modulation type. Accordingly, the second modulation type may be based on a modulation method with more values, which is used, for example, to modulate the payload data at the transmitter end.

The first modulation type may, for example, be a two-value frequency modulation method, and the second modulation type may be a modulation method with a value $M \geq 4$.

The frequency offset estimation unit in the first receiving section is, in one embodiment, designed to estimate the frequency offset by evaluation of a known bit sequence in a frequency-modulated received signal. In a burst transmission method such as Bluetooth or DECT, this bit sequence may be located at a known and fixed position in a data burst. If the structure of a data burst as used in a Bluetooth transmission system based on a Bluetooth Standard higher than 1.1, as is shown in FIG. 1a, this bit sequence may be part of the access code which is arranged at the start of the data burst. The data burst is formed, for example, by the trailer arranged at the end of the access code and is formed by a bit sequence of "1010" or "0101". Generally, it is advantageous for a bit sequence to be present which has the same number of 0 bits and 1 bits. If (G)FSK modulation is used as the first modulation type, it is then possible to calculate the average value of the sequence of the demodulated (G)FSK signals, and to use this result to determine the frequency offset.

In another embodiment of the present invention, the receiving apparatus is designed such that it comprises an analogue receiving section (or analogue front end) whose input is connected to an antenna and has two outputs which are respectively connected to the first receiving section and to the second receiving section. The analogue receiving section contains a mixer that is used to mix the analogue received signal to an intermediate frequency, or directly to baseband. Received signals which are modulated using the first modulation type are thus passed from the analogue receiving section via a first output to the first receiving section, and received signals which are modulated using the second modulation type are passed via a second output to the second receiving section.

In one embodiment, payload signals are demodulated at the transmitter end using the second modulation type, and are thus passed from the analogue receiving section via its second output to the second receiving section. The payload signals are then supplied as received signals which have been mixed to the intermediate bit frequency or directly to baseband to a first input of the frequency correction unit, and a signal which represents the estimated frequency offset is supplied to its second input. In this case, the frequency correction unit may comprise a digital frequency correction unit, utilizing an analogue/digital (A/D) converter provided in the signal path upstream of the frequency correction unit. The A/D converter may further be supplied with the received signal which has been mixed to an intermediate frequency or directly to baseband. The output of the A/D converter is then connected to one input of the digital frequency correction unit.

In particular, the digital frequency correction unit may be designed for frequency correction on the basis of the CORDIC algorithm. The CORDIC algorithm allows frequency correction to be carried out relatively easily. The CORDIC algorithm can be carried out with minimal circuit complexity, so that the costs of a circuit based on a low-cost oscillator and CORDIC correction are less than for an oscillator with complex compensation.

The CORDIC algorithm is described in J. E. Volder, "The CORDIC Trigonometric Computing Technique", IRE Trans. Electronic Computers, Vol. 8, pp. 330-334, 1959. The algorithm includes N iterations and is used for rotation of a vector through a defined angle $\alpha_n = \arctan(2^{-n})$, $n=0,1,\ldots,N-1$. If, as described initially, the vector represents the vector of a complex signal, this rotation allows the frequency of the signal to be changed by being multiplied by a frequency correction signal. The rotation angle becomes smaller with each iteration ($\alpha_0=45°>\alpha_1=26.6°> \ldots >\alpha_{N-1}$) so that the frequency of the signal changes in ever smaller steps as the number of iteration steps increases. Digital frequency correction by means of the CORDIC algorithm is also the subject matter of the document DE 199 48 899 A1, which is hereby included in the disclosure content of the present application.

If the received signal is mixed to an intermediate frequency in the mixer which is contained in the analogue receiving section, then the received signal which has been mixed to the intermediate frequency can be supplied to the first input of the frequency correction unit. In addition, a signal which represents the sum of the frequency offset and the intermediate frequency can be supplied to its second input. However, when the received signal is mixed to an intermediate frequency, it is also possible to provide for a first frequency correction unit and a second frequency correction unit to be provided in the second receiving section. In this case the received signal which has been mixed to an intermediate frequency is then supplied to a first input of the first frequency correction unit, and a signal which represents the intermediate frequency is supplied to a second input of the first frequency correction unit. The output signal from the first frequency correction unit is supplied directly or indirectly to a first input of the second frequency correction unit, and a signal which represents the frequency offset is supplied to a second input of the first frequency correction unit.

If the received signal is mixed by the mixer to an intermediate frequency in the analogue section, it is also possible to provide a bandpass filter for the output signal from the mixer, in particular to a polyphase filter. The analogue circuit components which are contained in this bandpass filter are subject to certain tolerances, so that it is possible to connect the bandpass filter to a filter matching unit. This filter matching unit may be connected to a frequency error calculation unit, which uses the information signal transmitted from the filter matching unit to determine any frequency error of the filter curve of the bandpass filter. A first frequency correction unit and a second frequency correction unit can be provided in the second receiving section, such that the received signal which has been mixed to an intermediate frequency is then supplied to a first input of the first frequency correction unit. Further, a signal which represents the sum of the intermediate frequency and the frequency error calculated by the frequency error calculation unit is supplied to a second input of the first frequency correction unit, and a signal which represents the frequency offset is supplied to the second frequency correction unit.

If there are two frequency correction units, then one or both of them can operate using the CORDIC algorithm. As an alternative to mixing of the received signal to an intermediate frequency, it is, however, also possible to have the mixer which is contained in the analogue receiving section mix the received signal directly to baseband. In this situation, the baseband signal is then supplied to a first input of the frequency correction unit, and a signal which represents the frequency offset is supplied to a second input of the frequency correction unit.

The mobile communications system may be a communications system which operates on the basis of bursts, such as communications systems which operate in accordance with the Bluetooth or DECT Standard. The receiving apparatus according to the invention is in effect designed for data transmission in bursts. In one example embodiment, the frequency offset estimation unit is then designed to estimate the frequency offset once and only once for the duration of a burst, and the frequency correction unit is designed to carry out the correction on the basis of the frequency offset, which has been supplied from the frequency offset estimation unit, throughout the duration of the burst.

Thus, in the embodiment described above, the frequency offset is estimated once at the start of a burst, and this estimated value is used as the basis for the frequency correction throughout the remaining duration of the burst. Any drift in the frequency offset which occurs during the burst is in this case initially ignored. However, a further correction unit can be provided for this purpose. In particular, when a phase modulation method is used as the second modulation type, a phase correction unit may be arranged in the signal path downstream from the frequency correction unit in the second receiving section, and may be designed to continuously compensate for drift in the frequency offset, by means of phase correction. Frequency offset drift can be caused either by drift of the carrier frequency of the received signal, by drift of the reference frequency or frequencies supplied to the mixer or to the mixers, or by drift of all of these frequencies.

In this case, the signal path upstream of the phase correction unit may include a delay demodulator for production of the phase difference values of those sample values which are separated by the time duration of a data symbol. The phase correction unit is then supplied with the successive phase difference values from the delay demodulator. In an M-value DPSK modulation method, the phase is shifted from one data symbol to the next by multiples of $(2\pi)/M$ or by $\phi_{offset}+(2\pi)/M$ as in an offset DPSK modulation method (for example $\pi/4$-DPQSK). The minimum phase shift from one data symbol to the next for an 8-DPSK modulation method is $(2\pi)/8=\pi/4$. It is thus possible to use the phase correction unit to readjust the frequency offset within a range of $\pm\pi/8=\pm22.5°$.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1b is an illustration of the tolerance requirement for the accuracy of the carrier frequency and the frequency offset over the time period of one data burst;

FIG. 2 is a schematic block diagram of one exemplary embodiment of a receiving apparatus according to the invention;

FIG. 3 is a schematic block diagram of a first exemplary embodiment of a second receiving section, which is connected to an analogue receiving section, in the receiving apparatus;

FIG. 7 is a block diagram of an example of the implementation of an M-DPSK receiving apparatus.

DETAILED DESCRIPTION OF THE INVENTION

Figure 1A:
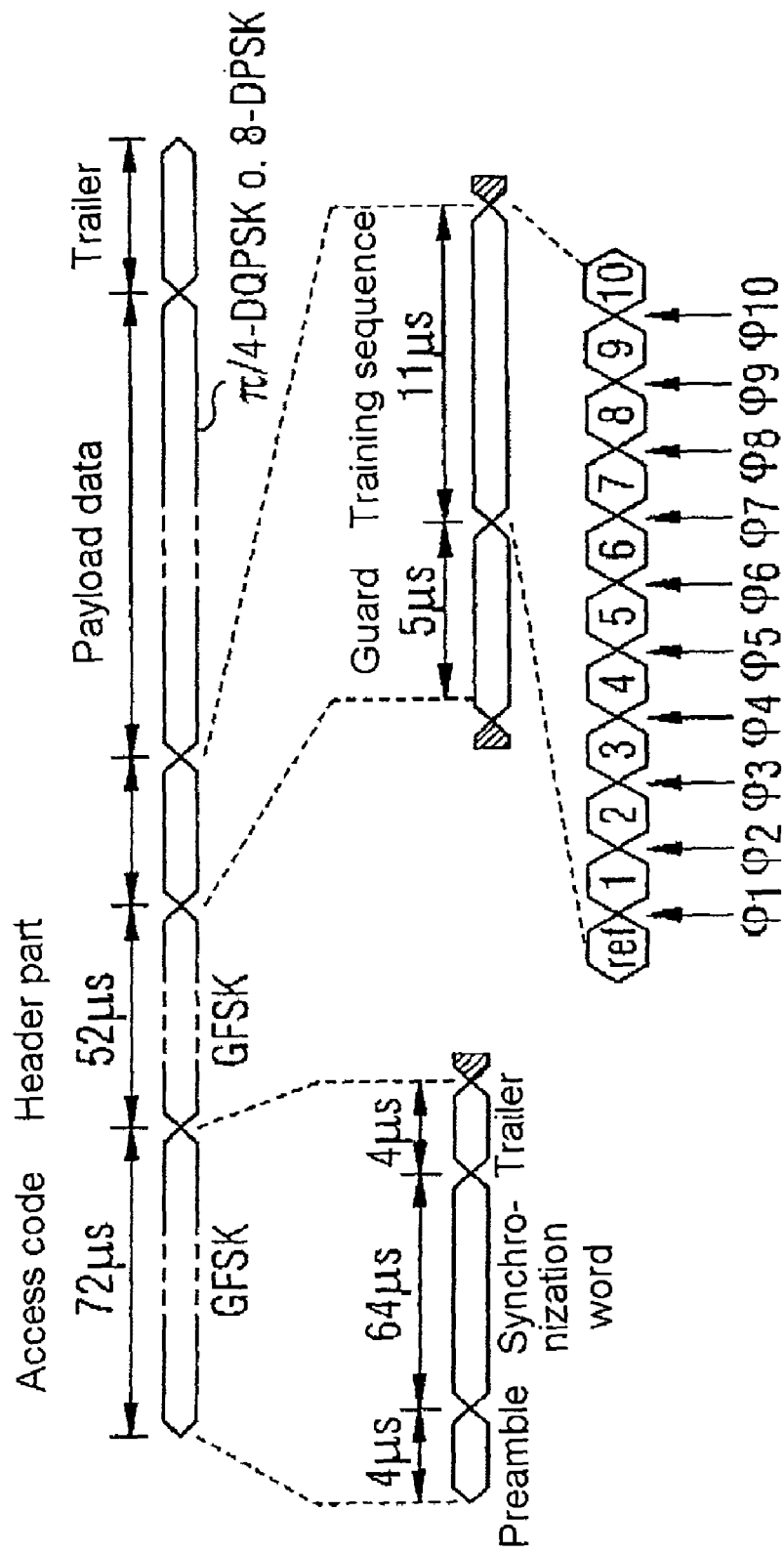
FIG. 1a is an illustration of the structure of the data burst.

The present invention will now be described with reference to the attached drawings, wherein like reference numerals are used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

FIG. 2 illustrates a schematic block diagram of one exemplary embodiment of a receiving apparatus in accordance with the present invention. The receiving apparatus comprises an analogue receiving section 10 (analogue front end), a GFSK receiver section 20, and an M-DPSK receiver section 30. In the analogue receiving section 10, the received signal coming from the antenna is initially supplied to an amplifier 11 (LNA, low noise amplifier). The amplified received signal is supplied from there to a complex mixer 12, in which the signal is mixed to an intermediate frequency or to baseband in a predetermined manner. This mixing is performed in an in-phase and a quadrature signal path, which are phase-shifted through 90° with respect to one another. The complex signals are then supplied to a polyphase filter 13. At the output of the polyphase filter 13 the signal path then branches. The signals are supplied either via a limiter 14 to the GFSK receiver section 20, or via a programmable gain control 15 (PGC) to the M-DPSK receiver section 30.

The GFSK-modulated symbols in the data burst are supplied successively in the GFSK receiver section 20 to a demodulation/synchronization unit 21, a decimation/filtering unit 22, and a digital demodulator 23. Real-value signals are input from the digital demodulator 23 into a frequency offset estimator 24, in which the frequency offset is estimated from the 1010 or 0101 bit sequence of the 4 μs-long trailer of the access code in the data burst.

The data burst signals, which have been DPSK modulated with M values, are initially supplied to an analogue/digital (A/D) converter 31 in the M-DPSK receiver section 30. The digitized signals are then passed to a unit 32 in which both digital demodulation as well as frequency offset compensation and phase readjustment are carried out. The signals which have been demodulated in this way are then supplied to a Gray decoder 33. A clock recovery unit is arranged in the signal path downstream from the Gray decoder 33, but is not required by the present invention and will therefore not be described in the following text.

FIG. 3 illustrates a first exemplary embodiment of an M-DPSK receiver section 30 connected to the analogue receiving section 10. A frequency correction unit 310 is arranged downstream from the A/D converter 31 in the signal path, operates on the basis of the CORDIC algorithm, and is thus also referred to in the following text as a CORDIC mixer 310. The digitized I and Q signal components are supplied to this CORDIC mixer 310. The CORDIC mixer 310 is also supplied with a signal which represents the sum of the intermediate frequency $f_{if}$ and the frequency offset $f_{offset}$, specifically with the term $\exp(-i \cdot 2 \cdot \pi \cdot (f_{if} + f_{offset}) \cdot T_{s1})$ The frequency offset $f_{offset}$ is, in the present example, obtained from the frequency offset estimator 24 in the GFSK receiver section 20. The frequency offset can be determined in the frequency offset estimator 24 by calculation of the average value of the demodulated GFSK signal of the bit sequence 1010 or 0101 in the trailer of the access code. In one embodiment, this may be implemented as a simple digital accumulator, whose output is also scaled, and is supplied to the unit 32 in the M-DPSK receiver section 30 in order to calculate the above term. The variable $T_{s1}$ is the sample period of the sample values which are supplied to the CORDIC mixer 310 from the A/D converter 31, which operates at a sampling frequency of $f_{s1}$.

Decimation to a sampling frequency $f_{s2}$ is carried out in a downstream decimation unit 32.1. After this, the signals are supplied to a group delay time equalizer 32.2, to a matched filter 32.3, and to an interpolation filter 32.4. The interpolation filter 32.4 emits interpolated signal values at a frequency $f_{s3}$.

The CORDIC mixer 310 operates, during a data burst, with the value of the frequency offset $f_{offset}$ transmitted to it from the frequency offset estimation unit 24. The delay demodulator 350, which is arranged downstream in the signal path, and the phase demapper 360 are also used to compensate for any drift in the frequency offset during the data burst. These are illustrated in greater detail in FIG. 4.

Figure 4:
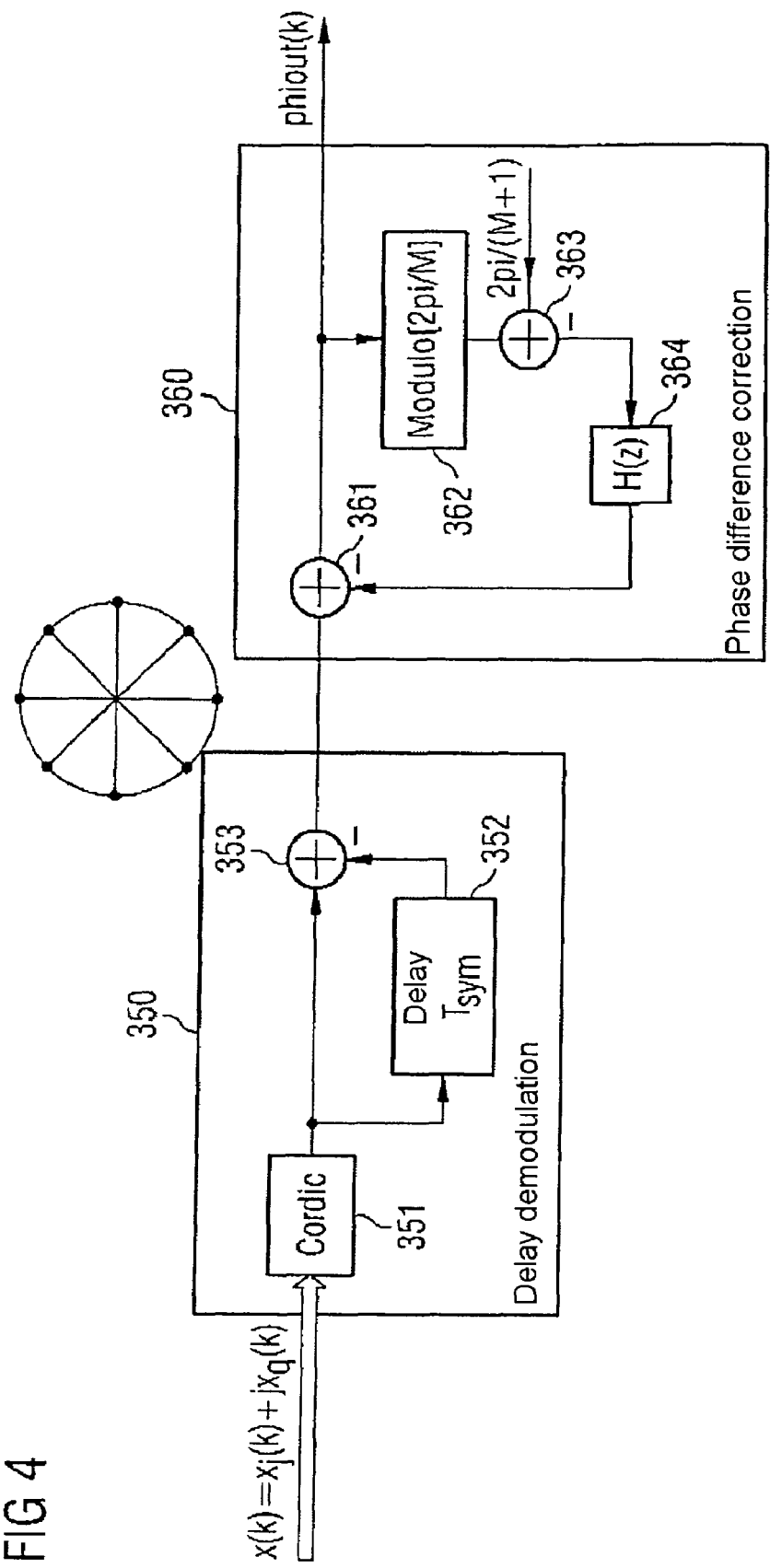
FIG. 4 is a block diagram of a phase correction unit for compensation for the drift of the frequency offset during a data burst.

Initially in FIG. 4, the delay demodulator 350 produces phase difference values from sample values which are separated by one symbol period $T_{sym}$ ($=T_{sample}$). An angle CORDIC unit 351 is used for this purpose, wherein the complex sample values x(k) are supplied to the input of the CORDIC unit 351, and wherein the phase values of these sample values are provided at the output of the CORDIC unit 351. The phase difference values are then produced by means of the delay unit 352 and the adder 353. The symbol space for an 8-DPSK modulation method is clearly indicated above the signal path between the units 350 and 360 in FIG. 4.

Generally, in the M-DPSK modulation method, the phase rotates from one data symbol to the next by multiples of $(2\pi)/M$ or by $\phi_{offset}+(2\pi)/M$(Offset-DPSK). The minimum phase shift from one symbol to the next for an 8-DPSK modulation method is $(2\pi)/8=\pi/4$. It is thus possible to use the phase difference correction unit or the phase demapper 360 to carry out readjustment within a range $\pm\pi/8=\pm22.5°$. The phase difference correction unit 360 for this purpose has a modulo unit 362, by means of which a modulo $(2\pi/M)$ operation is carried out. The value $2\pi/(M+1)$ is subtracted from the remainder of the modulo operation in an adder 363 downstream. The output of the adder 363 is supplied to a time-discrete filter 364 whose transfer function is H(z) and the output value from the filter 364 is subtracted in an adder 361 from a subsequent phase difference value. The corrected phase difference values emitted from the phase demapper 360 are then also supplied to a Gray decoder 33.

Figure 5:
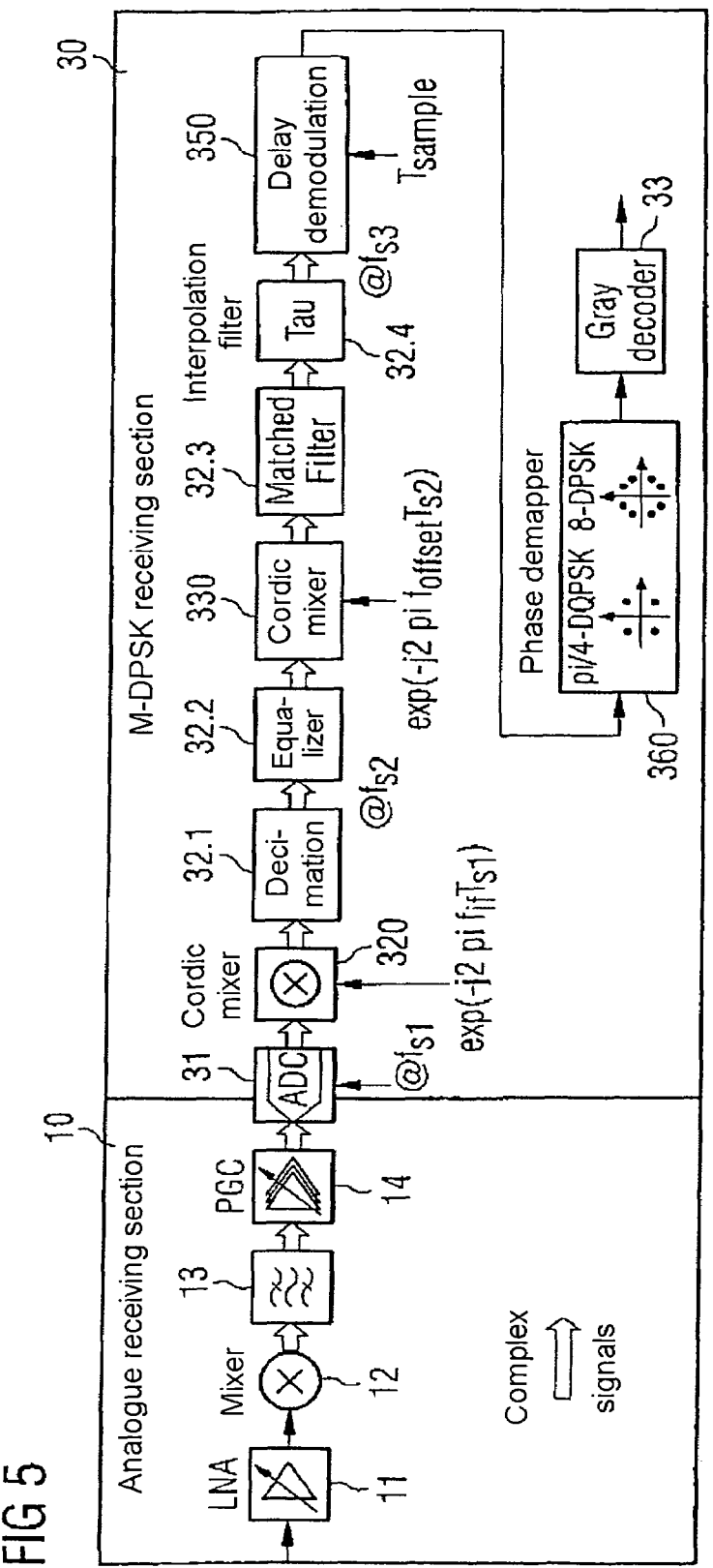
FIG. 5 is a block diagram of a second exemplary embodiment of the second receiving section, which is connected to the analogue receiving section, in the receiving apparatus according to the invention.

FIG. 5 illustrates a second exemplary embodiment of an M-DPSK receiving section 30 which is connected to the analogue receiving section 10. FIG. 5 is similar in context to that of FIG. 3, and as such may not be completely described again for the sake of brevity. Accordingly, similar reference symbols have been used for assemblies having similar functions. In contrast to FIG. 3, two CORDIC mixers 320 and 330 may be used. The first CORDIC mixer 320 performs a digital multiplication operation by the intermediate frequency $f_{if}$. As a result, the first CORDIC mixer 320 is supplied with a signal which represents the intermediate frequency $f_{if}$, that is to say with the term $\exp(-i \cdot \pi \cdot f_{if} \cdot T_{s1})$. The second CORDIC mixer 330 accomplishes a digital multiplication operation by the frequency offset $f_{offset}$. Thus, the second CORDIC mixer 330 is supplied with a signal which represents the frequency offset $f_{offset}$, that is to say with the term $\exp(-i \cdot 2 \cdot \pi \cdot f_{offset} \cdot T_{s2})$, where $T_{s2}$ is the sample period of the signal values based on the decimation to the frequency $f_{s2}$.

Figure 6:
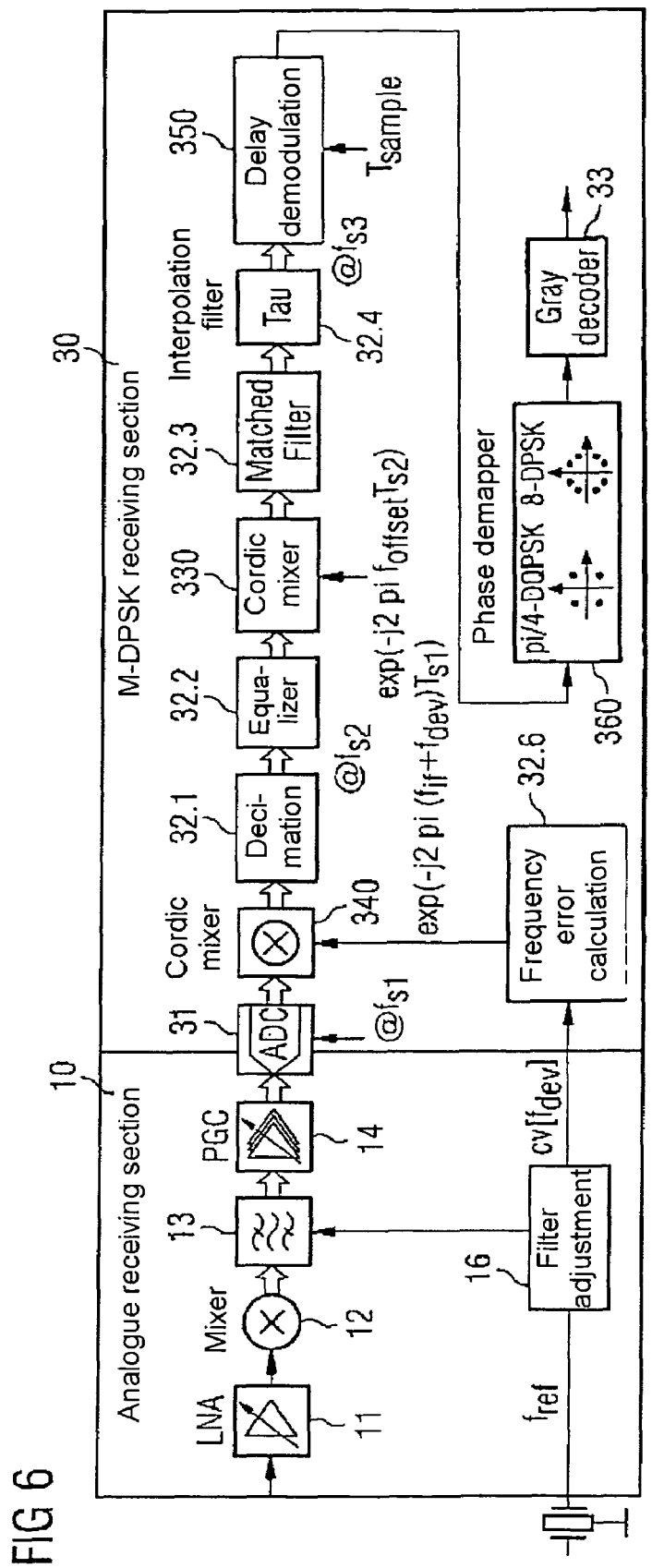
FIG. 6 is a block diagram of a third exemplary embodiment of the second receiving section, which is connected to the analogue receiving section, in the receiving apparatus according to the invention.

FIG. 6 illustrates a third exemplary embodiment of an M-DPSK receiving section 30 which is connected to the analogue receiving section 10. FIG. 6 is similar to that of FIG. 5, and as such may not be completely described again for the sake of brevity. Accordingly, similar assemblies having the same function have been provided with the same reference symbols. The M-DPSK receiving section 30 in FIG. 6 also has two CORDIC mixers, wherein the second CORDIC mixer 330 may perform a digital multiplication operation by the frequency offset $f_{offset}$, in the same way as in the exemplary embodiment shown in FIG. 5.

In contrast to the embodiment shown in FIG. 5, the first CORDIC mixer 340 of FIG. 6 performs a digital multiplication operation by a frequency which is the sum frequency of the intermediate frequency and a calculated frequency error $f_{dev}$ from the polyphase filter 13. The polyphase filter 13 must be regularly adjusted because of tolerances in its analogue circuit components. This process is carried out by a filter adjustment unit 16, which is arranged in the analogue receiving section 10. The adjustment process can be carried out by a gate-controlled measurement of an RC time constant. The RC time constant is matched to the resistors and capacitors used in the active operational amplifiers.

The measurement is carried out by starting a counter, which is gate-controlled by the RC time constant. The output of the counter is connected to switch selectable resistors or capacitors in the operational amplifiers. The error between the count and a nominal count is used as a measure of the frequency shift of the filter curve. The count $cv(f_{dev})$ is supplied to a frequency error calculation unit 32.6, which is contained in the M-DPSK receiving section 30, for scaling the count and determining the frequency error. The output from this scaling unit is supplied to the CORDIC mixer 340, in which the term $\exp(-i \cdot \pi \cdot (f_{if} + f_{dev}) \cdot T_{s1})$ is calculated, using the intermediate frequency $f_{if}$, as a result of which the CORDIC mixer 340 down-mixes the signal to baseband.

FIG. 7 illustrates one exemplary embodiment of a receiver architecture for a Bluetooth receiving system. The A/D converters 31.1 and 31.2 for the I and Q signal components operate at a sampling rate of 8 MHz, and with a word length of 7 bits for the amplitude quantization. The sampling rate is reduced by a factor of four to 2 MHz, which corresponds to twice the symbol frequency of 1 Msymbol/s, in the decimation unit 32.1. After group delay time equalization, which is carried out in the equalizer 32.2, and the filtering which is carried out in the matched filter 32.3, the signal is interpolated by the factor 6.5 in the interpolation filter 32.4 to produce 13 Msamples/s. The reason for this interpolation by the factor 6.5 is that the sample phase detection unit is in one embodiment a correlator which is operated at 13 times the bit rate (1 MHz).

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, the term "exemplary" as utilized herein merely means an example, rather than the best.

What is claimed is:

1. A receiving apparatus for a mobile communications system, comprising:
    a first receiving section configured to demodulate received signals of a first modulation type, the first receiving section comprising a frequency offset estimation unit; and
    a second receiving section configured to demodulate received signals of a second modulation type, the second receiving section comprising a frequency correction unit configured to correct the frequency offset;
    wherein the first receiving section is connected to the second receiving section configured to transmit the estimated frequency offset from the first receiving section to the second receiving; and
    wherein the first modulation type comprises a two-value frequency modulation method, and the second modulation type comprises a modulation method having an M-value of M≧4.

2. The receiving apparatus of claim 1, wherein the apparatus is used in a Bluetooth communications system.

3. A receiving apparatus for a mobile communications system, comprising:
    a first receiving section configured to demodulate received signals of a first modulation type, the first receiving section comprising a frequency offset estimation unit; and
    a second receiving section configured to demodulate received signals of a second modulation type, the second receiving section comprising a frequency correction unit configured to correct the frequency offset;
    wherein the first receiving section is connected to the second receiving section configured to transmit the estimated frequency offset from the first receiving section to the second receiving section; and
    wherein the frequency offset estimation unit estimates the frequency offset by evaluation of a known bit sequence in a frequency-modulated received signal.

4. The receiving apparatus of claim 3, wherein
    the first modulation type comprises a Gaussian Frequency Shift Keying modulation method;
    the known bit sequence has the same number of 0 bits and 1 bits; and
    the frequency offset estimation unit calculates the mean value of the demodulated Gaussian Frequency Shift Keying signals, and determines the frequency offset from the calculated mean value.

5. The receiving apparatus of claim 3, wherein the apparatus is used in a Bluetooth communications system.

6. A receiving apparatus for a mobile communications system, comprising:
    a first receiving section configured to demodulate received signals of a first modulation type, the first receiving section comprising a frequency offset estimation unit; and
    a second receiving section configured to demodulate received signals of a second modulation type, the second receiving section comprising a frequency correction unit configured to correct the frequency offset;
    wherein the first receiving section is connected to the second receiving section configured to transmit the estimated frequency offset from the first receiving section to the second receiving section;

an analogue receiving section having an input connected to an antenna and having two outputs respectively connected to the first receiving section and to the second receiving section;

a mixer configured to mix the analogue received signal to an intermediate frequency, or directly to baseband;

wherein the received signal which has been mixed to an intermediate frequency or directly to baseband is supplied to a first input of the frequency correction unit and a signal which represents the estimated frequency offset is supplied to a second input of the frequency correction unit; and wherein the received signal which has been mixed to an intermediate frequency is supplied to the first input of the frequency correction unit, and a signal which represents the sum of the frequency offset and the intermediate frequency is supplied to the second input of the frequency correction unit.

7. The receiving apparatus of claim 6, wherein the frequency correction unit comprises a digital frequency correction unit, the received signal which has been mixed to the intermediate frequency or directly to baseband is supplied to an analogue/digital (A/D) converter, and the output of the A/D converter is connected to the first input of the digital frequency correction unit.

8. A receiving apparatus for a mobile communications system, comprising:
   a first receiving section configured to demodulate received signals of a first modulation type, the first receiving section comprising a frequency offset estimation unit;
   a second receiving section configured to demodulate received signals of a second modulation type, the second receiving section comprising a frequency correction unit configured to correct the frequency offset;
   wherein the first receiving section is connected to the second receiving section configured to transmit the estimated frequency offset from the first receiving section to the second receiving section;
   an analogue receiving section having an input connected to an antenna and having two outputs respectively connected to the first receiving section and to the second receiving section;
   a mixer configured to mix the analogue received signal to an intermediate frequency, or directly to baseband;
   wherein the received signal which has been mixed to an intermediate frequency or directly to baseband is supplied to a first input of the frequency correction unit and a signal which represents the estimated frequency offset is supplied to a second input of the frequency correction unit;
   a first frequency correction unit and a second frequency correction unit;
   wherein the received signal which has been mixed to an intermediate frequency is supplied to a first input of the first frequency correction unit and a signal which represents the intermediate frequency is supplied to a second input of the first frequency correction unit; and
   wherein the output signal from the first frequency correction unit is supplied directly or indirectly to a first input of the second frequency correction unit, and a signal which represents the frequency offset is supplied to a second input of the second frequency correction unit.

9. The receiving apparatus of claim 8, wherein the frequency correction unit comprises a digital frequency correction unit, the received signal which has been mixed to the intermediate frequency or directly to baseband is supplied to an analogue/digital (A/D) converter, and the output of the A/D converter is connected to the first input of the digital frequency correction unit.

10. The receiving apparatus of claim 9, wherein the digital frequency correction unit corrects the frequency based on a Coordinate Rotation Digital Computer algorithm.

11. A receiving apparatus for a mobile communications system, comprising:
   a first receiving section configured to demodulate received signals of a first modulation type, the first receiving section comprising a frequency offset estimation unit;
   a second receiving section configured to demodulate received signals of a second modulation type, the second receiving section comprising a frequency correction unit configured to correct the frequency offset;
   wherein the first receiving section is connected to the second receiving section configured to transmit the estimated frequency offset from the first receiving section to the second receiving section;
   an analogue receiving section having an input connected to an antenna and having two outputs respectively connected to the first receiving section and to the second receiving section;
   a mixer configured to mix the analogue received signal to an intermediate frequency, or directly to baseband;
   wherein the received signal is mixed by the mixer to the intermediate frequency, and the output signal from the mixer is supplied to a polyphase filter, the polyphase filter is connected to a filter matching unit which is connected to a frequency error calculation unit;
   wherein a first frequency correction unit and a second frequency correction unit are provided;
   wherein the received signal which has been mixed to an intermediate frequency is supplied to a first input of the first frequency correction unit, and a signal that represents the sum of the intermediate frequency and the frequency error calculated by the frequency error calculation unit is supplied to a second input of the first frequency correction unit; and
   wherein a signal that represents the frequency offset is supplied to the second frequency correction unit.

12. A receiving apparatus for a mobile communications system, comprising:
   a first receiving section configured to demodulate received signals of a first modulation type, the first receiving section comprising a frequency offset estimation unit; and
   a second receiving section configured to demodulate received signals of a second modulation type, the second receiving section comprising a frequency correction unit configured to correct the frequency offset;
   wherein the first receiving section is connected to the second receiving section configured to transmit the estimated frequency offset from the first receiving section to the second receiving section; and
   wherein the receiving apparatus is configured for burst data transmission, and the frequency offset estimation unit is operable to estimate the frequency offset in one example, once and only once for the duration of a burst, and the frequency correction unit is operable to perform the correction based on the frequency offset that has been supplied from the frequency offset estimation unit throughout the duration of the burst.

13. The receiving apparatus of claim 12, wherein the second modulation type comprises a phase modulation method, and wherein a phase correction unit is arranged in the signal path downstream from the frequency correction unit in the second receiving section, and is operable to continuously compensate for any drift in the frequency offset, based on phase corrections by the phase correction unit.

14. The receiving apparatus of claim 13, further comprising:
   a delay demodulator configured to produce phase difference values of sample values that are separated by the time duration of a data symbol; and
   wherein the phase difference values are supplied to the phase correction unit.

15. A receiving apparatus for a mobile communications system, comprising:
   a first receiving section configured to demodulate received signals of a first modulation type, the first receiving section comprising a frequency offset estimation unit;
   a second receiving section configured to demodulate received signals of a second modulation type, the second receiving section comprising a frequency correction unit configured to correct the frequency offset; and
   an analogue receiving section having an input connected to an antenna and having two outputs respectively connected to the first receiving section and to the second receiving section; and
   wherein the first receiving section is connected to the second receiving section, and is configured to transmit the estimated frequency offset from the first receiving section to the second receiving section; and
   wherein the first modulation type comprises a two-value frequency modulation method, and the second modulation type comprises a modulation method having an M-value greater than or equal to 4.

16. The receiving apparatus of claim 15, further comprising a mixer configured to mix the analogue received signal to an intermediate frequency, or directly to baseband.

17. A receiving apparatus for a mobile communications system, comprising:
   a first receiving section configured to demodulate received signals of a first modulation type, the first receiving section comprising a frequency offset estimation unit;
   a second receiving section configured to demodulate received signals of a second modulation type, the second receiving section comprising a frequency correction unit configured to correct the frequency offset; and
   an analogue receiving section having an input connected to an antenna and having two outputs respectively connected to the first receiving section and to the second receiving section; and
   wherein the first receiving section is connected to the second receiving section, and is configured to transmit the estimated frequency offset from the first receiving section to the second receiving section; and
   wherein the frequency offset estimation unit estimates the frequency offset by evaluation of a known bit sequence in a frequency-modulated received signal.

18. The receiving apparatus of claim 17, wherein the first modulation type comprises a Gaussian Frequency Shift Keying modulation method;
   the known bit sequence has the same number of 0 bits and 1 bits; and
   the frequency offset estimation unit calculates the mean value of the demodulated Gaussian Frequency Shift Keying signals, and determines the frequency offset from the calculated mean value.

19. The receiving apparatus of claim 17, further comprising a mixer configured to mix the analogue received signal to an intermediate frequency, or directly to baseband.

20. The receiving apparatus of claim 19, wherein the digital frequency correction unit corrects the frequency based on a Coordinate Rotation Digital Computer algorithm.

* * * * *